(12) United States Patent
Kim et al.

(10) Patent No.: US 9,261,364 B2
(45) Date of Patent: Feb. 16, 2016

(54) DRIVING CIRCUIT, SYSTEM, AND DRIVING METHOD FOR GYRO SENSOR

(75) Inventors: Sung Tae Kim, Suwon-si (KR); Soo Woong Lee, Suwon-si (KR); Chang Hyun Kim, Yongin-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 364 days.

(21) Appl. No.: 13/584,666

(22) Filed: Aug. 13, 2012

(65) Prior Publication Data

US 2013/0047727 A1 Feb. 28, 2013

(30) Foreign Application Priority Data

Aug. 26, 2011 (KR) .................. 10-2011-0085757

(51) Int. Cl.
*G01C 19/56* (2012.01)
*G01C 19/5776* (2012.01)

(52) U.S. Cl.
CPC ............ *G01C 19/5776* (2013.01); *G01C 19/56* (2013.01)

(58) Field of Classification Search
CPC ............... G01C 19/56; G01C 19/5776; G01C 19/5712; G01C 19/5719; G01C 19/5649
USPC ............... 73/504.12, 504.15, 504.16, 504.04, 73/504.02
See application file for complete search history.

(56) References Cited

U.S. PATENT DOCUMENTS

| 5,794,080 | A | * | 8/1998 | Watanabe et al. | 396/53 |
| 6,125,701 | A | * | 10/2000 | Sugitani et al. | 73/504.16 |
| 7,069,783 | B2 | * | 7/2006 | Uehara | 73/514.12 |
| 7,434,466 | B2 | | 10/2008 | Ito | |
| 7,779,687 | B2 | * | 8/2010 | Murashima | 73/504.12 |
| 7,805,993 | B2 | * | 10/2010 | Spahlinger | 73/504.02 |
| 8,451,066 | B2 | * | 5/2013 | Murakami et al. | 331/25 |
| 2011/0179868 | A1 | * | 7/2011 | Kaino et al. | 73/504.12 |
| 2012/0096942 | A1 | * | 4/2012 | Hayashi et al. | 73/504.12 |

FOREIGN PATENT DOCUMENTS

| JP | 10-227643 | 8/1998 |
| JP | 2006170620 | 6/2006 |
| JP | 2008-756597 A | 11/2008 |
| KR | 1020000072188 | 12/2000 |
| KR | 10-2001-0094126 A | 10/2001 |

* cited by examiner

*Primary Examiner* — Helen Kwok
(74) *Attorney, Agent, or Firm* — NSIP Law

(57) ABSTRACT

Provided is a driving circuit, system, and driving method for a gyro sensor. The gyro sensor driving circuit includes a charge/voltage conversion unit receiving a charge output from a vibration-type gyro sensor and converting the charge output into a voltage signal; a phase converting unit receiving a signal from the charge/voltage converting unit and converting a phase of the received signal; a pulse generating unit receiving an output signal of the phase converting unit and outputting the output signal as a pulse wave; a pulse converting unit converting the pulse wave output from the pulse generating unit into a pulse signal using a certain voltage level as reference so as to apply the pulse wave as a driving signal; and a control unit controlling the pulse converting unit to generate the pulse signal using the certain voltage level as reference.

12 Claims, 5 Drawing Sheets

DRIVING CIRCUIT, SYSTEM, AND DRIVING METHOD FOR GYRO SENSOR

CROSS-REFERENCE TO RELATED APPLICATIONS

This application claims the benefit of Korean Patent Application No. 10-2011-0085757 filed with the Korea Intellectual Property Office on Aug. 26, 2011, the disclosure of which is incorporated herein by reference.

BACKGROUND OF THE INVENTION

1. Field of the Invention

The present invention relates to a driving circuit, system, and driving method for a gyro sensor, and more particularly, to a gyro sensor driving circuit for driving a vibration-type gyro sensor, a gyro sensor system including the same, and a gyro sensor driving method.

2. Description of the Related Art

Gyro sensors, which detect an angular velocity, are widely used for attitude control of aircrafts, rockets and robots, vibration compensation of cameras and telescopes, anti-slide and anti-rotation systems of vehicles, navigation systems, and so on. In recent times, gyro sensors are also mounted on smartphones to enhance applicability thereof.

Gyro sensors are classified into various types such as a rotary-type, a vibration-type, a fluid-type, an optical-type, and so on. The vibration-type gyro sensors are currently used for mobile products. The vibration-type gyro sensors may be generally classified into two types, a piezoelectric-type and a capacitance-type. Currently-used vibration-type gyro sensors are mostly applied to a capacitance-type comb structure, and partially applied to the piezoelectric-type.

The piezoelectric-type gyro sensor generally detects a magnitude of angular velocity by Coriolis' Force. Since a large signal magnitude can be obtained under the condition of vibration at a resonance frequency magnitude of mass, a driving circuit is very important.

A conventional driving method is a method of receiving a signal of a charge amplifier, in which a charge of a vibration-type sensor is converted into a voltage, to change a phase of the signal by 90° at a phase shifter, and amplifying the signal to apply a voltage to the vibration-type sensor again. Conventionally, the method is classified as a method of amplifying a signal at a final stage to apply the signal in a sine waveform, or a method of applying a signal in a pulse. Of course, while the signal is applied in a pulse, an output of the vibration-type sensor is represented in a sine waveform.

Conventionally, a sensor output is determined by combining a driving signal portion and a gyro signal component portion. However, when the driving signal portion is too large, the sensor may be malfunctioned or the signal may be saturated, a sensor signal cannot be appropriately detected. Accordingly, a driving signal level should be adjusted so that the signal is not saturated.

SUMMARY OF THE INVENTION

The present invention has been invented in order to overcome the above-described problems and it is, therefore, an object of the present invention to adjust a magnitude of a driving signal, enabling generation of an appropriate signal level of sensor signal output. That is, as a signal magnitude of the driving signal is adjusted, gain of a sensor signal can be adjusted.

In accordance with one aspect of the present invention to achieve the object, there is provided a gyro sensor driving circuit including: a charge/voltage conversion unit configured to receive a charge output from a vibration-type gyro sensor and to covert the charge output into a voltage signal; a phase converting unit configured to receive a signal from the charge/voltage converting unit and to convert a phase of the received signal; a pulse generating unit configured to receive an output signal of the phase converting unit and to output the output signal as a pulse wave; a pulse converting unit configured to convert the pulse wave output from the pulse generating unit into a pulse signal using a certain voltage level as reference so as to apply the pulse wave as a driving signal; and a control unit configured to control the pulse converting unit to generate the pulse signal using the certain voltage level as reference.

According to another embodiment of the present invention, the pulse converting unit may include a voltage distributor configured to distribute a certain voltage to voltage levels; and a certain potential pulse generating circuit configured to be switched by a pulse wave output from the pulse generating unit and to generate the pulse signal using the certain voltage level obtained from the voltage levels distributed by the voltage distributor as reference according to control of the control unit.

In addition, according to one embodiment of the present invention, the certain potential pulse generating circuit may include a plurality of first switching devices of which pairs are complementarily switched by the pulse wave output from the pulse generating and output one of voltage levels distributed by the voltage distributor as a high level and another as a low level to generate pulse signals having the certain voltage level, respectively; a plurality of second switching devices configured to receive pulse signals output through the first switching devices and to output only the pulse signal using the certain voltage level as reference according to control of the control unit; and a capacitor configured to remove a pulse peak generated according to switching at the first switching devices.

Further, according to one embodiment of the present invention, the gyro sensor driving circuit may further include a buffer unit configured to maintain a pulse waveform of the pulse signal converted by the pulse converting unit and to apply the pulse signal as the driving signal.

According to another embodiment of the present invention, the vibration-type gyro sensor may be a piezoelectric-type or capacitance-type sensor.

In accordance with another aspect of the present invention to achieve the object, there is provided a gyro sensor system including a vibration-type gyro sensor configured to receive a driving signal and to output a sensor signal according to movement of an object; a gyro sensor driving circuit configured to receive an output of the gyro sensor, convert the output of the gyro sensor into a voltage signal, generate the driving signal from the converted voltage signal and apply the driving signal to the gyro sensor, which is according to any one of the above embodiments; an analog signal processing unit configured to receive the converted voltage signal output from the gyro sensor driving circuit, remove the driving signal component included in the sensor signal, and separate a gyro signal component included in the sensor signal; a demodulation signal applying unit configured to apply a demodulation signal for separating the gyro signal component to the analog signal processing unit; an analog-digital converting unit configured to convert the gyro signal component processed through the analog signal processing unit into a digital signal;

and a digital signal processing unit configured to process the converted digital signal and to output the processed signal.

According to another embodiment of the present invention, the vibration-type gyro sensor may be a piezoelectric-type or capacitance-type sensor.

In accordance with still another aspect of the present invention to achieve the object, there is provided a gyro sensor driving method including a charge/voltage converting step of receiving a charge output of a vibration-type gyro sensor and converting the output into a voltage signal; a phase converting step of receiving the converted voltage signal and converting a phase of the signal; a pulse wave generating step of receiving the phase-converted signal and outputting the signal as a pulse wave; a driving signal generating step of converting the output pulse wave into a pulse driving signal using a certain voltage level as reference according to a control so as to apply the pulse wave as the driving signal; and a driving signal applying step of applying the pulse driving signal to the gyro sensor.

According to another embodiment of the present invention, in the driving signal generating step, a certain voltage may be distributed to voltage levels, and the pulse driving signal using the certain voltage level obtained from the distributed voltage levels, according to switching by the pulse wave output from the pulse wave generating step, as reference may be generated according to the control.

According to one embodiment of the present invention, in the driving signal applying step, a pulse waveform of the generated pulse driving signal may be maintained and applied as the driving signal.

According to another embodiment of the present invention, the vibration-type gyro sensor may be a piezoelectric-type or capacitance-type sensor.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
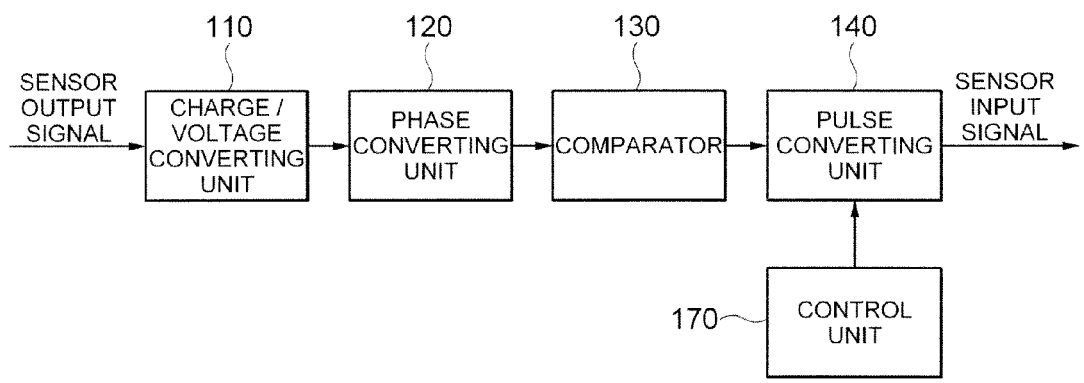
FIG. 1 is a block diagram schematically showing a gyro sensor driving circuit in accordance with an exemplary embodiment of the present invention.

The following embodiments are provided as examples to fully convey the spirit of the invention to those skilled in the art. Therefore, the present invention should not be construed as limited to the embodiments set forth herein and may be embodied in different forms. And, the size and the thickness of an apparatus may be overdrawn in the drawings for the convenience of explanation. The same components are represented by the same reference numerals hereinafter.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, components and/or groups, but do not preclude the presence or addition of one or more other features, components, and/or groups thereof.

First, a gyro sensor driving circuit in accordance with a first exemplary embodiment of the present invention will be described with reference to the accompanying drawings.

Figure 2:
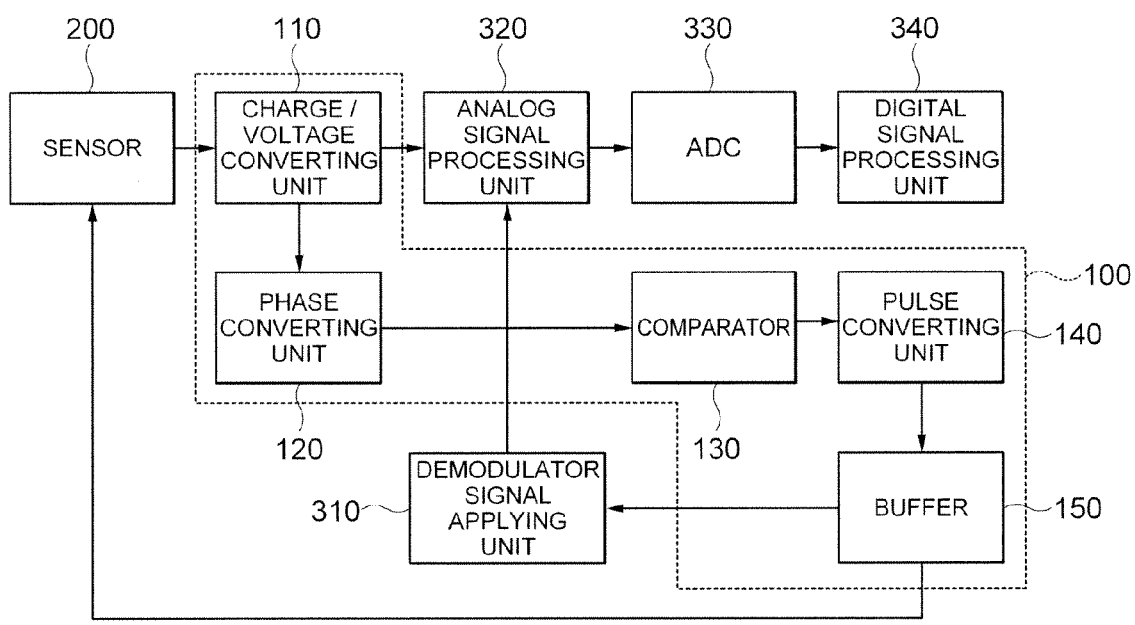
FIG. 2 is a block diagram schematically showing a gyro sensor system including the gyro sensor driving circuit in accordance with the exemplary embodiment of the present invention.
Figure 3:
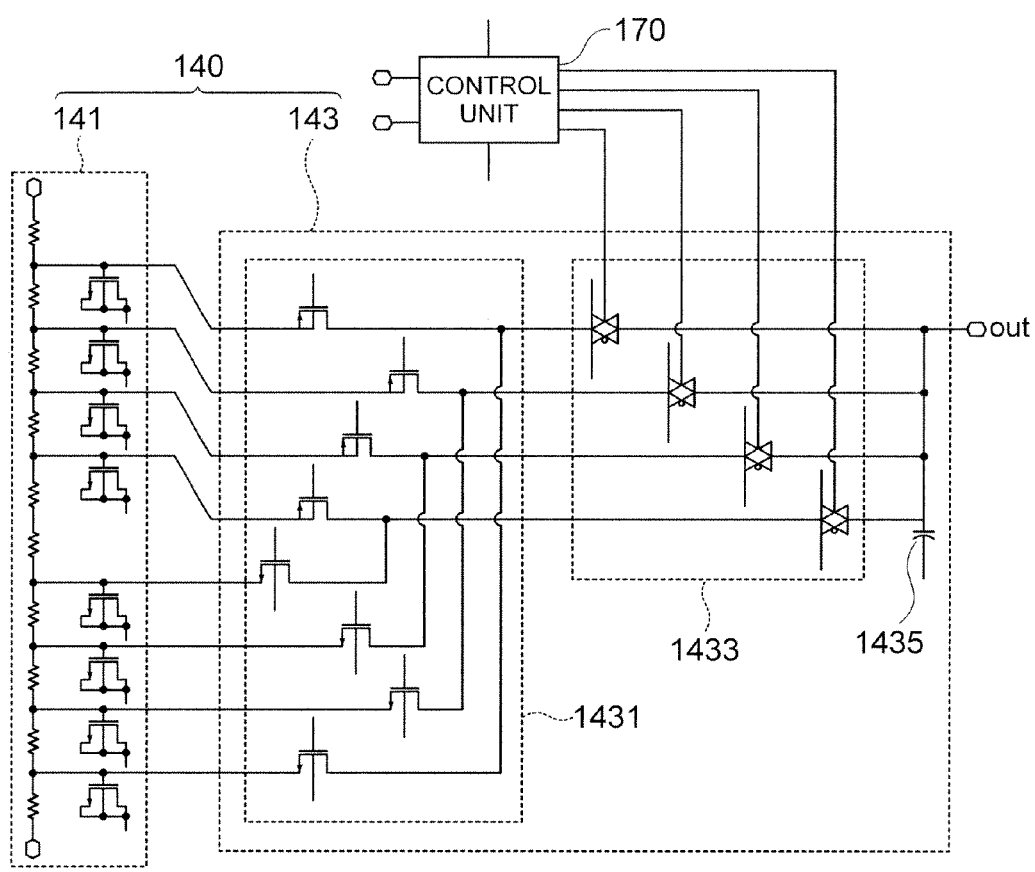
FIG. 3 is a circuit diagram showing a pulse conversion unit of the gyro sensor driving circuit in accordance with the exemplary embodiment of the present invention.
Figure 4:
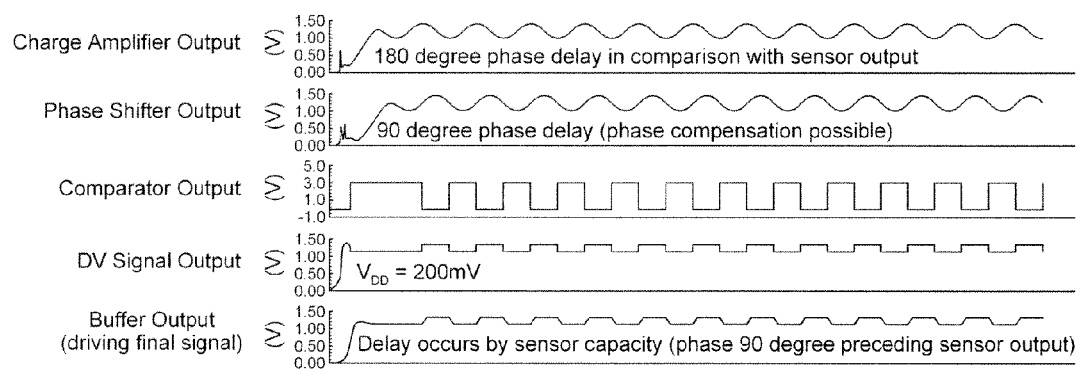
FIG. 4 is a view showing an output signal of each block of the gyro sensor driving circuit in accordance with the exemplary embodiment of the present invention.

FIG. 1 is a block diagram schematically showing a gyro sensor driving circuit in accordance with an exemplary embodiment of the present invention, FIG. 2 is a block diagram schematically showing a gyro sensor system including the gyro sensor driving circuit in accordance with the exemplary embodiment of the present invention, FIG. 3 is a circuit diagram showing a pulse conversion unit of the gyro sensor driving circuit in accordance with the exemplary embodiment of the present invention, and FIG. 4 is a view showing an output signal of each block of the gyro sensor driving circuit in accordance with the exemplary embodiment of the present invention.

First, referring to FIG. 1, the gyro sensor driving circuit in accordance with an exemplary embodiment of the present invention includes a charge/voltage conversion unit 110, a phase conversion unit 120, a pulse generating unit 130, a pulse conversion unit 140, and a control unit 170. In addition, referring to FIG. 2, according to an embodiment, the circuit may further include a buffer unit 150.

Referring to FIG. 1 and/or FIG. 2, the charge/voltage conversion unit 110 will be described. The charge/voltage conversion unit 110 receives a charge output of a vibration-type gyro sensor 200 and converts it into a voltage signal. Here, according to an example, the vibration-type gyro sensor 200 may be a piezoelectric-type or a capacitance-type sensor. Since the piezoelectric-type and capacitance-type sensors are well known as examples of the vibration-type gyro sensor 200 in the art, further detailed description thereof will be omitted.

A sensor output signal of the vibration-type gyro sensor 200 includes an output according to a driving signal component and a gyro signal component output according to movement of an object. Here, the output component according to the driving signal is much larger than the gyro signal component output. In addition, a phase of the output according to the driving signal component is delayed by 90° than the driving signal applied to the sensor. Accordingly, substantially, the sensor output signal, of which a phase is delayed by almost 90° than the driving signal, is input into the charge/voltage conversion unit 110.

The vibration-type sensor receives a driving signal to generate Coriolis' Output. A sensor output voltage by induction of Coriolis' Force will be described below. According to one example, relationship between the driving signal and the sensor output signal will be described as follows.

$$V_{dx1} = V_{dz} \cos(2\pi f_z t)$$

$$V_{x1} = S_{dz}V_{dz}\sin(2\pi f_z t) + S_{\Omega_y}\Omega_y \cos(2\pi f_{\Omega_y} t) \times V_{dz}/V_{dz0} \cos(2\pi f_z t) + V_{nx1}$$

$$V_{dx2} = V_{dz} \cos(2\pi f_z t)$$

$$V_{x2} = S_{dz}V_{dz}\sin(2\pi f_z t) + S_{\Omega_y}\Omega_y \cos(2\pi f_{\Omega_y} t) \times V_{dz}/V_{dz0} \cos(2\pi f_z t) + V_{nx2}$$

$$V_{dy1} = V_{dz} \cos(2\pi f_z t)$$

$$V_{y1} = S_{dz}V_{dz}\sin(2\pi f_z t) + S_{\Omega_z}\Omega_z \cos(2\pi f_{\Omega_z} t) \times V_{dz}/V_{dz0} \cos(2\pi f_z t) + V_{ny1}$$

$$V_{dy2} = V_{dz} \cos(2\pi f_z t)$$

$$V_{y1} = S_{dz}V_{dz}\sin(2\pi f_z t) + S_{\Omega_z}\Omega_z \cos(2\pi f_{\Omega_z} t) \times V_{dz}/V_{dz0} \cos(2\pi f_z t) + V_{ny2}$$

Here, $V_{dx1}$ and $V_{dx2}$ represent x-axis direction driving voltages, $V_{dy1}$ and $V_{dy2}$ represent y-axis direction driving voltages, $f_z$ represents a z-axis direction frequency, $V_{x1}$ and $V_{x2}$ represent x-axis direction outputs, $V_{y1}$ and $V_{y2}$ represent y-axis direction outputs, and $V_{dz}$ represents z-axis direction driving signal magnitude. $S_{dz}$ represents z-axis gain by capacitance or piezoelectricity, $S_{\Omega_x}$ and $S_{\Omega_y}$ represent gyro natural gain, $\Omega_x$ and $\Omega_y$ represent an angular velocity showing rotation in x- and y-axis directions. $S_{\Omega_y}\Omega_y \cos(2\pi f_{\Omega_y} t)$ and $S_{\Omega_x}\Omega_x \cos(2\pi f_{\Omega_x} t)$ represent gyro signal component factors, and $V_{nx1}$, $V_{nx2}$, $V_{ny1}$ and $V_{ny2}$ represent noises. In addition, $S_{dz}V_{dz} \sin(2\pi f_z t)$ represents a sensor output component according to a driving voltage signal, $S_{\Omega_y}\Omega_y \cos(2\pi f_{\Omega_y} t) \times V_{dz}/V_{dz0} \cos(2\pi f_z t)$ and $S_{\Omega_x}\Omega_x \cos(2\pi f_{\Omega_x} t) \times V_{dz}/V_{dz0} \cos(2\pi f_z t)$ may be represented by a gyro signal component output of an object, i.e., a product of a gyro natural frequency and a driving signal. While $\cos(2\pi f_{\Omega_y} t)$ of the gyro signal component factor exemplarily describes a sine wave, a pulse-type signal may be provided rather than the sine wave.

Referring the relational expression of the driving signal and the sensor output signal, a phase of the driving signal component is substantially delayed by 90° to be represented as a sensor output, and the gyro signal component is represented as a product of the gyro natural frequency and the driving signal. Here, since the driving signal component has a magnitude substantially larger than that of the gyro signal component, the gyro signal component exerts no particular influence on the driving. If a pulse wave is input into the sensor input, the sensor output may be represented as a sine wave, of which a phase is delayed by 90°.

In one example, the charge/voltage conversion unit 110 includes a charge amplifier. In one example, the charge amplifier receives a sensor output signal and converts the signal into a voltage signal, of which a phase is inverted by 180°, to output the voltage signal. Accordingly, the charge amplifier outputs a signal, of which a phase substantially precedes 90° than the driving signal applied to the charge amplifier.

Next, the phase conversion unit 120 will be described. The phase conversion unit 120 receives a signal from the charge/voltage conversion unit 110 and converts the phase. In one example, the phase conversion unit 120 includes a phase shifter. In one example, the phase shifter delays 90° a phase of a voltage signal passed through the charge/voltage conversion unit 110, for example, the charge amplifier. Accordingly, the signal passed through the phase shifter has a phase 90° preceding the sensor output signal.

The output component according to the driving signal is much larger at the sensor output signal, and a phase of the output component according to the driving signal is substantially 90° delayed than the driving signal. Accordingly, in one example, since the driving signal of the gyro sensor 200 must have a phase 90° preceding the sensor output signal, the phase is converted such that the signal to be applied as the driving signal using the phase shifter substantially 90° precedes the sensor output signal. The phase can be adjusted using the phase shifter. When a load capacitor of the gyro sensor 200 is large, the phase is varied. Here, the phase can be adjusted by the phase shifter. In addition, in one example, when the phase shifter having a gain is provided, it is possible to adjust a ratio R3/R2 of a resistance R2 between an input stage and an inverse terminal (−) of an OP amplifier and a resistance R3 between the inverse terminal (−) of the OP amplifier and an output stage. In order to 90° delay the phase at the phase shifter, relationship between a variable resistance R1 between the input stage and a non-inverse terminal (+) of the OP amplifier and a capacitor Cs between the non-inverse terminal (+) and a ground stage is as follows.

$$f_c = \frac{1}{2\pi R_1 C_s}$$

Here, $f_c$ represents a sensor resonance frequency.

While theoretically equal to the above formula, since a phase deviation occurs due to a process deviation and a circuit delay, etc., of a resistor and a capacitor, a structure is configured such that the resistor or the capacitor can be tuned. Since the phase shifter circuit is well known in the art, additional detailed description will be omitted.

Continuously, referring to FIG. 1 and/or FIG. 2, the pulse generating unit 130 receives an output signal of the phase conversion unit 120 and outputs the signal as a pulse wave. In one example, the pulse generating unit 130 includes a comparator configured to receive a signal output from the phase shifter and generate a pulse to output the pulse wave. Since an output of the phase shifter passes through the pulse generating unit 130 to be represented as a pulse wave and the driving signal level must be adjusted such that the sensor driving signal is not saturated, the pulse wave must be converted into a signal having a certain potential level.

In addition, continuously, referring to FIG. 1 and/or FIG. 2, the pulse conversion unit 140 converts a pulse wave output from the pulse generating unit 130 into a pulse signal using a certain voltage level(s) as reference so as to apply the pulse wave as the driving signal. In general, a pulse wave or a sine wave is applied as a driving signal of the gyro sensor. Here, the pulse wave makes a larger sensor output. When the pulse wave is applied as the driving signal, if a large voltage from the ground to a VDD is applied, the sensor may be malfunctioned or abnormally operated. Accordingly, the driving signal level must be maintained at a certain voltage. In this embodiment, the pulse conversion unit 140 maintains the driving signal level at a certain voltage. In addition, the driving signal level can be adjusted for adjusting the gain. If the gain is increased, the signal is saturated at the charge/voltage conversion unit 110, for example, the charge amplifier, so that a normal operation cannot be accomplished. Accordingly, it is very important to generate a maximum gain that the signal is not saturated.

Referring to FIG. 3, an embodiment of the pulse conversion unit 140 will be described in detail. According to one embodiment, the pulse conversion unit 140 includes a voltage distributor 141 and a certain potential pulse generating circuit 143. The voltage distributor 141 distributes a certain voltage to some voltage levels. For example, in one example, as shown in FIG. 3, the voltage distributor 141 can distribute to some voltage levels according to a resistance ratio with reference to a certain voltage. In addition, referring to FIG. 3, in one example, the voltage distributor 141 can reduce noise peaking due to a charge injection effect of a switch by installing a MOS capacitor at the output stage divided and output according to a resistance ratio. The circuit voltage-distributed by the voltage distributor 141 passes through the certain potential pulse generating circuit 143.

In addition, the certain potential pulse generating circuit 143 is switched by a pulse wave output from the pulse generating unit 130. At this time, a pulse signal using a certain voltage level(s) as reference is generated from the voltage levels distributed by the voltage distributor 141 according to control of the control unit 170.

Referring to FIG. 3, an example of the certain potential pulse generating circuit 143 will be described in detail. According to one embodiment, the certain potential pulse generating circuit 143 includes a plurality of first switching devices 1431, a plurality of second switching devices 1433, and a capacitor 1435. Here, the plurality of first switching devices 1431 may comprise some pairs. The each of pairs is complementarily switched by a pulse wave output from the pulse generating unit 130 and outputs one of voltage levels distributed by the voltage distributor 141 as a high level and another as a low level. Accordingly, the plurality of first switching devices 1431 may generate and output the pulse signal using the certain voltage level(s) as reference. Here, the plurality of first switching devices 1431 may be constituted by a CMOS. In addition, the plurality of second switching devices 1433 receive pulse signals output through the first switching devices 1431 and output only the pulse signal using the certain voltage level(s) as reference according to control of the control unit 170. In one example, the plurality of second switching devices 1433 may be constituted by analog MUXs (multiplexers). In addition, the capacitor 1435 is provided to remove a pulse peak generated according to switching at the first switching devices 1431.

According to one example, referring to FIG. 3, the pulse generated from the pulse generating unit 130 is applied to the switch to be sequentially turned ON/OFF to generate a pulse signal having a certain voltage level reference. The generated pulses may be selected according to the control of the control unit 170 to generate a final output pulse of a square wave. In one example, the finally output driving signal pulse passes through the buffer unit 150 and applied as a sensor input signal since loading performance of the capacitor is weak. In one example, since the phase is varied when a sensor load capacitor is larger, the phase of the phase shifter must be adjusted.

In addition, continuously, referring to FIG. 1 and/or FIG. 3, the control unit 170 controls the pulse conversion unit 140 to generate a pulse signal using a certain voltage level as reference. While the control unit is not shown in FIG. 2, the control unit is also provided in the embodiment according to FIG. 2.

Further, referring to FIG. 2, one embodiment of the present invention will be described. The gyro sensor driving circuit further includes the buffer unit 150 to maintain a pulse waveform of the pulse signal converted at the pulse conversion unit 140 and apply a driving signal.

Next, a gyro sensor system in accordance with a second exemplary embodiment of the present invention will be described with reference to the accompanying drawings. FIG. 2 is a block diagram schematically showing the gyro sensor system including the gyro sensor driving circuit in accordance with an exemplary embodiment of the present invention. In description or understanding of the embodiment of the present invention, embodiments of the gyro sensor driving circuit as well as FIG. 2 will be described, and thus, overlapped description will be omitted.

Referring to FIG. 2, the gyro sensor system in accordance with an exemplary embodiment of the present invention includes a vibration-type gyro sensor 200, a gyro sensor driving circuit 100, an analog signal processing unit 320, a demodulation signal applying unit 310, an analog-digital conversion unit 330, and a digital signal processing unit 340.

The vibration-type gyro sensor 200 receives a driving signal to output a sensor signal according to movement of an object. The gyro sensor 200 receives a driving signal to output a signal in which an the output component according to the driving signal and a gyro signal output component are mixed. That is, the sensor performs a function of a modulator. According to another embodiment, the vibration-type gyro sensor 200 may be a piezoelectric-type or capacitance-type sensor.

The gyro sensor driving circuit 100 receives an output of the gyro sensor 200 and converts the output of the gyro sensor 200 into a voltage signal, and generates a driving signal so as to apply it to the gyro sensor 200. The above embodiments are referenced.

The analog signal processing unit 320 of FIG. 2 receives a voltage signal output from the gyro sensor driving circuit 100 and removes the driving signal component included in the sensor signal, separating a gyro signal component included in the sensor signal. A function of a demodulator configured to separate a signal combined with the sensor output signal is performed at the analog signal processing unit 320. A function of the demodulator is to separate the output component according to the driving signal and the gyro signal output component. In one example, the output according to the driving signal passed through a filter may be removed, and the gyro signal component may be remained. Here, in one example, a demodulation signal is applied and passes through the filter, for example, a low pass filter (LPF), and thus, the output according to the driving signal can be removed to remain the gyro signal component only. Here, the signal applied to the demodulator may have a phase 90° preceding the sensor output signal.

The demodulation signal applying unit 310 applies a demodulation signal to the analog signal processing unit 320 to separate the gyro signal component. In one example, the modulation signal may be a driving signal output from the gyro sensor driving circuit 100.

The analog-digital conversion unit 330 includes an analog-digital converter (ADC), and converts the gyro signal component processed through the analog signal processing unit 320 into a digital signal.

The digital signal processing unit 340 processes and outputs a digital signal converted through the ADC.

Hereinafter, a gyro sensor driving method in accordance with a third exemplary embodiment of the present invention will be described with referent to FIG. 5. In review of the embodiments, the embodiments of the gyro sensor driving circuit will be described with reference to FIGS. 1 to 5 as well as FIG. 5, and thus, overlapped description will be omitted.

Figure 5:
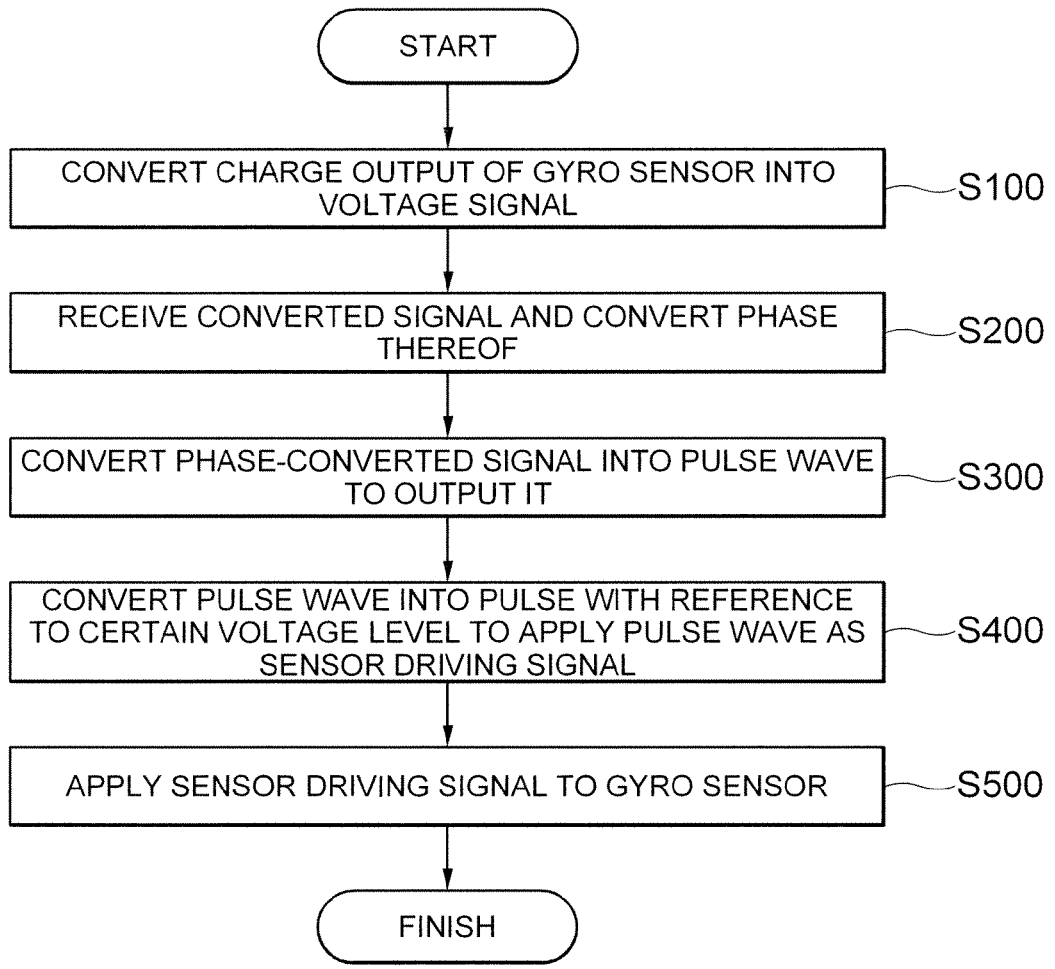
FIG. 5 is a flowchart schematically showing a gyro sensor driving method in accordance with an exemplary embodiment of the present invention.

FIG. 5 is a flowchart schematically showing a gyro sensor driving method in accordance with an exemplary embodiment of the present invention.

Referring to FIG. 5, one embodiment of the gyro sensor driving method includes a charge/voltage converting step S100, a phase converting step S200, a pulse wave generating step S300, a driving signal generating step S400 and a driving signal applying step S500.

First, in the charge/voltage converting step S100, a charge output of the vibration-type gyro sensor 200 is received to be converted into a voltage signal and converted. Here, according to one embodiment, the vibration-type gyro sensor 200 may be a piezoelectric-type or capacitance-type sensor.

Next, in the phase converting step S200, the converted voltage signal is received to convert a phase of the signal and the phase of the signal is converted.

Next, in the pulse wave generating step S300, the phase-shifted signal is received to be output as a pulse wave and the pulse wave is output.

In the driving signal generating step S400, in order to apply the output pulse wave as a driving signal, the pulse wave is converted into a pulse driving signal using a certain voltage level as reference according to a control.

According to another embodiment of the present invention, in the driving signal generating step S400, a certain voltage may be distributed to some voltage levels, and the pulse driving signal using the certain voltage level(s), obtained from the distributed voltage levels according to switching by the pulse wave output from the pulse wave generating step S300, as reference may be generated according to the control.

Then, in the driving signal applying step S500, the pulse driving signal is applied to the gyro sensor 200.

In addition, according to one embodiment of the present invention, in the driving signal applying step S500, a pulse waveform of the generated pulse driving signal may be maintained and applied as a driving signal.

Embodiments of the invention have been discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention.

As can be seen from the foregoing, the driving signal level can be adjusted to adjust failure and/or gain of the sensor, improving a signal processing ability.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A gyro sensor driving circuit comprising:
    a charge/voltage conversion unit configured to receive a charge output from a vibration-type gyro sensor and to convert the charge output into a voltage signal;
    a phase converting unit configured to receive a signal from the charge/voltage converting unit and to convert a phase of the received signal;
    a pulse generating unit configured to receive an output signal of the phase converting unit and to output the output signal as a pulse wave;
    a pulse converting unit configured to convert the pulse wave output from the pulse generating unit into a pulse signal using a certain voltage level as reference so as to apply the pulse signal as a driving signal of the vibration-type gyro sensor; and
    a control unit configured to control the pulse converting unit to generate the pulse signal using the certain voltage level as reference,
    wherein the pulse converting unit comprises:
        a voltage distributor configured to distribute a certain voltage to voltage levels; and
        a certain potential pulse generating circuit configured to be switched by a pulse wave output from the pulse generating unit and to generate the pulse signal using the certain voltage level obtained from the voltage levels distributed by the voltage distributor as reference according to control of the control unit.

2. The gyro sensor driving circuit according to claim 1, wherein the certain potential pulse generating circuit comprises:
    a plurality of first switching devices of which pairs are complementarily switched by the pulse wave output from the pulse generating unit and output one of voltage levels distributed by the voltage distributor as a high level and another as a low level to generate pulse signals having the certain voltage level, respectively;
    a plurality of second switching devices configured to receive pulse signals output through the first switching devices and to output only the pulse signal using the certain voltage level as reference according to control of the control unit; and
    a capacitor configured to remove a pulse peak generated according to switching at the first switching devices.

3. The gyro sensor driving circuit according to claim 1, further comprising a buffer unit configured to maintain a pulse waveform of the pulse signal converted by the pulse converting unit and to apply the pulse signal as the driving signal.

4. The gyro sensor driving circuit according to claim 1, wherein the vibration-type gyro sensor is a piezoelectric-type or capacitance-type sensor.

5. The gyro sensor driving circuit according to claim 2, wherein the vibration-type gyro sensor is a piezoelectric-type or capacitance-type sensor.

6. The gyro sensor driving circuit according to claim 3, wherein the vibration-type gyro sensor is a piezoelectric-type or capacitance-type sensor.

7. A gyro sensor system comprising:
    a vibration-type gyro sensor configured to receive a driving signal and to output a sensor signal according to movement of an object;
    a gyro sensor driving circuit configured to receive an output of the gyro sensor, convert the output of the gyro sensor into a voltage signal, generate the driving signal from the converted voltage signal and apply the driving signal to the gyro sensor, which is according to claim 1;
    an analog signal processing unit configured to receive the converted voltage signal output from the gyro sensor driving circuit, remove the driving signal included in the sensor signal, and separate a gyro signal component included in the sensor signal;
    a demodulation signal applying unit configured to apply a demodulation signal for separating the gyro signal component to the analog signal processing unit;
    an analog-digital converting unit configured to convert the gyro signal component processed through the analog signal processing unit into a digital signal; and
    a digital signal processing unit configured to process the digital signal and to output the processed digital signal.

8. The gyro sensor system according to claim 7, wherein the gyro sensor driving circuit further comprises a buffer unit configured to maintain a pulse waveform of the pulse signal converted by the pulse converting unit and to apply the pulse signal as the driving signal.

9. The gyro sensor system according to claim 7, wherein the vibration-type gyro sensor is a piezoelectric-type or capacitance-type sensor.

10. A gyro sensor driving method comprising:
   a charge/voltage converting step of receiving a charge output of a vibration-type gyro sensor and converting the charge output into a voltage signal;
   a phase converting step of receiving the voltage signal and converting a phase of the voltage signal;
   a pulse wave generating step of receiving the phase-converted voltage signal and outputting the phase-converted voltage signal as a pulse wave;
   a driving signal generating step of converting the output pulse wave into a pulse driving signal using a certain voltage level as reference according to a control; and
   a driving signal applying step of applying the pulse driving signal to the gyro sensor,
   wherein, in the driving signal generating step, a certain voltage is distributed to voltage levels, and the pulse driving signal using the certain voltage level obtained from the distributed voltage levels, according to switching by the pulse wave output from the pulse wave generating step, as reference is generated according to the control.

11. The gyro sensor driving method according to claim 10, wherein, in the driving signal applying step, a pulse waveform of the generated pulse driving signal is maintained and applied as the driving signal.

12. The gyro sensor driving method according to claim 10, wherein the vibration-type gyro sensor is a piezoelectric-type or capacitance-type sensor.

* * * * *